No. 854,558. PATENTED MAY 21, 1907.
L. V. BENÉT & H. A. MERCIÉ.
APPARATUS FOR SIGHTING ORDNANCE.
APPLICATION FILED JAN. 24, 1907.

Witnesses
Geo. A. Byrne
W. Mary Duvall

Inventors
L. V. Benét
H. A. Mercié
by Wilkinson & Fisher
Attorneys

No. 854,558. PATENTED MAY 21, 1907.
L. V. BENÉT & H. A. MERCIÉ.
APPARATUS FOR SIGHTING ORDNANCE.
APPLICATION FILED JAN. 24, 1907.

Witnesses
Geo. H. Bruce.
W. May Duvall.

Inventors,
L. V. Benét
H. A. Mercié,
by Wilkinson & Fisher
Attorneys

No. 854,558.          PATENTED MAY 21, 1907.
L. V. BENÉT & H. A. MERCIÉ.
APPARATUS FOR SIGHTING ORDNANCE.
APPLICATION FILED JAN. 24, 1907.

No. 854,558. PATENTED MAY 21, 1907.
L. V. BENÉT & H. A. MERCIÉ.
APPARATUS FOR SIGHTING ORDNANCE.
APPLICATION FILED JAN. 24, 1907.

No. 854,558. PATENTED MAY 21, 1907.
L. V. BENÉT & H. A. MERCIÉ.
APPARATUS FOR SIGHTING ORDNANCE.
APPLICATION FILED JAN. 24, 1907.

UNITED STATES PATENT OFFICE.

LAURENCE V. BENÉT AND HENRI A. MERCIÉ, OF PARIS, FRANCE.

APPARATUS FOR SIGHTING ORDNANCE.

No. 854,558.         Specification of Letters Patent.        Patented May 21, 1907.

Application filed January 24, 1907. Serial No. 353,803.

*To all whom it may concern:*

Be it known that we, LAURENCE V. BENÉT, a citizen of the United States, and HENRI A. MERCIÉ, a citizen of the French Republic, both residing at Paris, France, have invented certain new and useful Improvements in Apparatus for Sighting Ordnance; and we do hereby declare the following to be a full, clear, and exact description of the invention, such as will enable others skilled in the art to which it appertains to make and use the same.

Our present invention relates to improvements in sighting apparatus for ordnance, and it consists in certain improved means whereby the sights may be rapidly adjusted and may be held firmly in any desired position without shaking loose and entirely independent of the vibrations of the system.

The invention also provides scales that may be very easily read.

It also provides an arrangement for readily adjusting the sights for lateral errors, and for locking the sights at any lateral angle in a positive way.

The apparatus finally comprises a mount for the telescope carried by the supporting bar, so that the motions of the said bar or of the sliding leaf carried thereby may be transmitted to the telescope, and the device may be used either with or without the telescope, according to the exigencies of the occasion, or the preference of the gun pointer.

Furthermore, the apparatus is so arranged that only a single opening in the gun shield is required, both for seeing the target, or for using the sights.

Our invention will be understood by reference to the accompanying drawings, in which the same parts are indicated by the same letters throughout the several views.

Figs. 11 to 15 show a modified form of apparatus for adjusting the sights in elevation.

Referring first to the apparatus shown in Figs. 1 to 10, A represents the gun body, which may be of any usual or preferred type, and is mounted to recoil in an ordinary cradle B, trunnioned, as at B', in the mount C, carrying the gun shield C', which is perforated as at C⁰.

Figure 3:
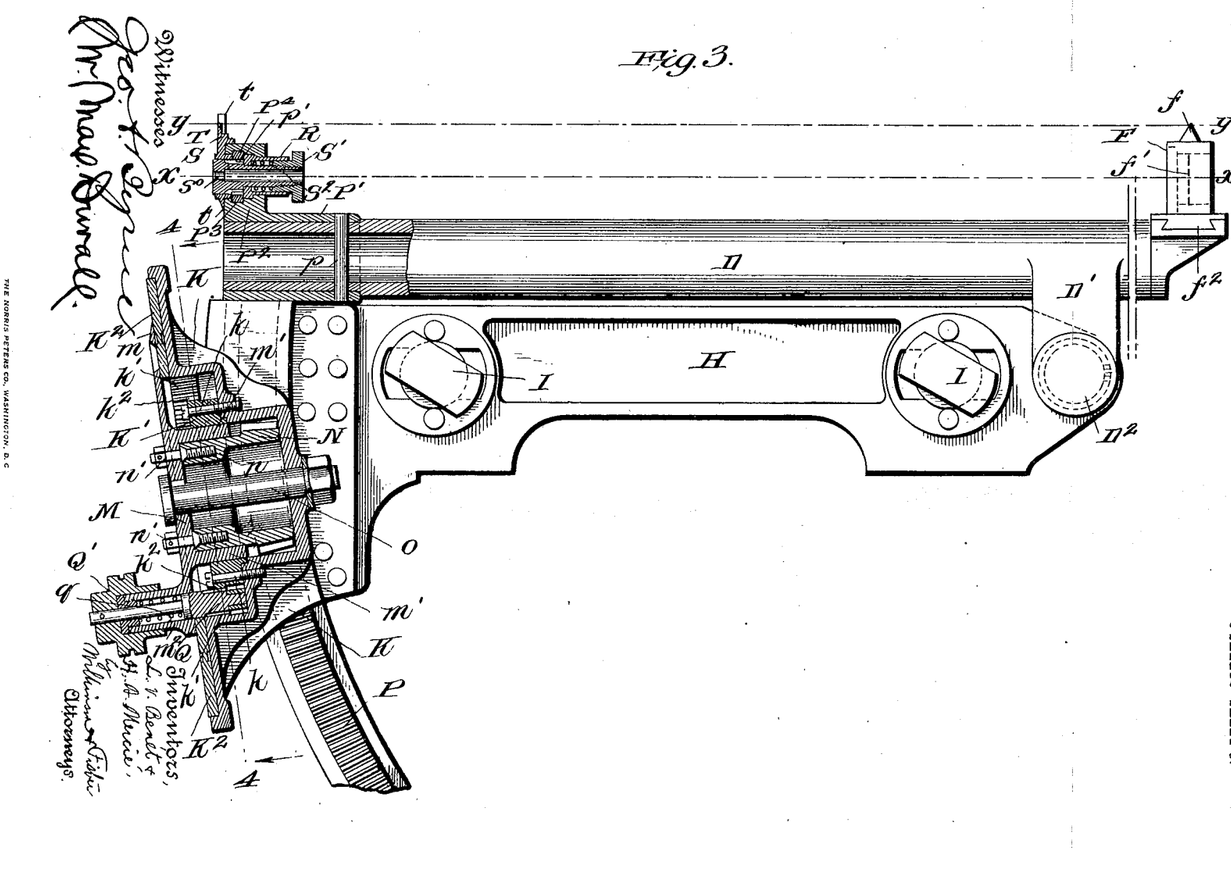
Fig. 3 represents a section along the broken line 3—3 of Fig. 2 and looking in the direction of the arrows, but with the hand knob and pointer swung through 90 degrees from the position shown in Fig. 2.
Figure 4:
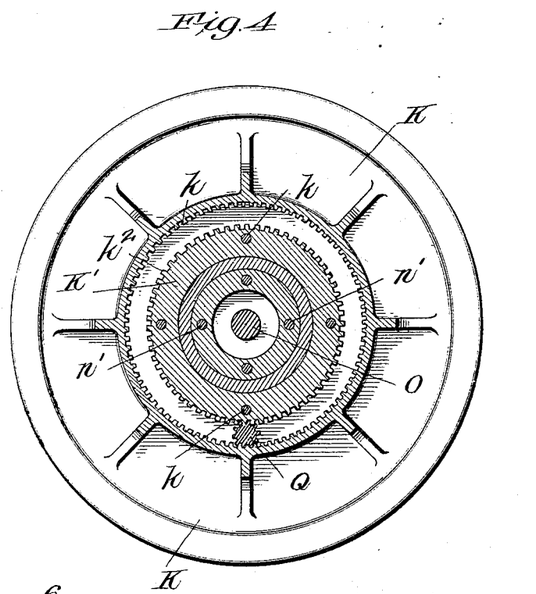
Fig. 4 shows a section along the line 4—4 of Fig. 3, and looking in the direction of the arrows.
Figures 7, 8:
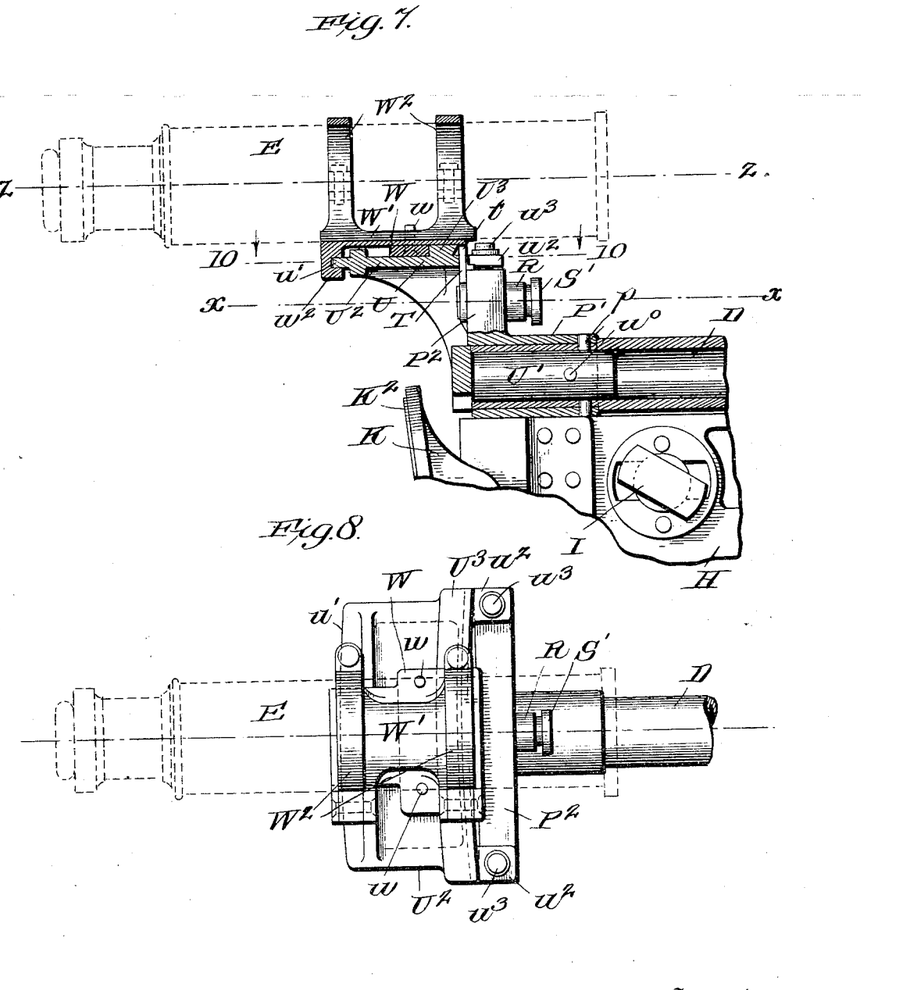
Fig. 7 shows the mode of attaching the telescope bracket to the sighting arrangement, the parts being shown in central vertical section, and the telescope being indicated in dotted lines.
Fig. 8 is a plan view of the device shown in Fig. 7.
Figure 9:
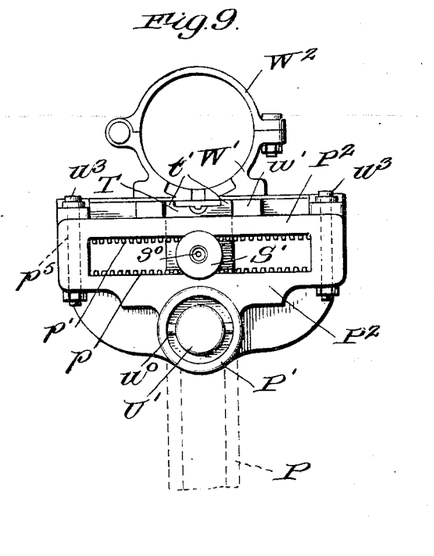
Fig. 9 is a rear view of the device shown in Figs. 7 and 8, but with the telescope omitted.

D represents the supporting bar, which has downwardly projecting legs D', pivoted as at D² to the plate H, which is firmly secured, as by the screws I, to the cradle B. The telescope E is carried by the rear end of the bar D, as will be hereinafter described, while the front end of the bar carries the front sight $f$ projecting from the block F, which block is preferably provided with cross hairs $f'$, and is dove-tailed, as at $f^2$, into the bar D. This bar D is preferably made in the form of a hollow cylinder, as shown in Figs. 3 and 7.

Secured to the plate H is the gear box K, which box is provided with two chambers of different diameters. In the outer chamber the circular rack $k'$ is secured having internal teeth. This rack may be made integral with the box, if preferred. In the same chamber the annular block K' is secured by means of the bolts $k$. This block K' has short cog teeth $k^2$ of similar pitch to those of the rack $k'$. On the rear of the box is secured, by bolts $k^3$, the annular plate $K^2$, provided with a series of graduations. There are preferably two sets of graduations concentrically disposed, the one to indicate angles of elevation, and the other to indicate ranges in yards or meters. Concentric with the plate $K^2$ is the plate M, which is provided with a pointer $m$. This plate carries a bearing sleeve $m'$, which is journaled in the block K, and in which is secured, by bolts $n'$, the socket $n$ of the angular pinion N, which meshes with the curved rack P, secured by a sleeve $P'$ and pin $p$ to the bar D. The plate M is provided with a journal bolt O, which rotates in the box K.

The plate M is provided with a hollow projection $m^2$ adapted to receive the stem of the gear Q. This gear has teeth adapted to engage both the rack $k'$ and the teeth $k^2$, when the said gear is in the forward position, into which it is normally forced by means of the spring $q$. The stem of this gear carries a hand knob $Q'$, by means of which the gear may be drawn back. When drawn back completely the gear Q is disengaged from both racks $k^2$ and $k'$, and if the hand knob $Q'$ is used as a crank handle the plate M, and with it the pointer $m$ as well as the angular pinion N, may be rapidly rotated without the intermediary of the gearing. As the angular pinion N meshes with the curved rack P its rotation will move the bar D through the desired vertical angle. When the pointer $m$ has been brought to approximately the desired graduation, as described above, the fine adjustment is secured by bringing the hand knob $Q'$ to its middle position in which the gear Q meshes with the rack $k'$ but does not engage the teeth of $k^2$. Now by rotating the hand-knob $Q'$ itself and consequently the gear Q the pointer $m$ is brought to the desired graduation. The arrangement will be locked by simply releasing the hand knob $Q'$ when the gear Q will snap into engagement with the teeth of $k^2$, and, being already in engagement with the teeth of $k'$, will lock the pinion positively against further rotation in either direction, thus preventing the shifting of the pointer $m$ due to vibration incident to firing the gun or any other causes. Thus it will be seen that we provide an arrangement which permits quick and nice adjustment of the sights in elevation, and in which the parts are automatically locked against shocks and jars tending to shift the direction of the line of sight. A similar result is secured with regard to adjusting the line of sight for lateral errors, by means of the apparatus that will now be described.

Figures 5, 6:
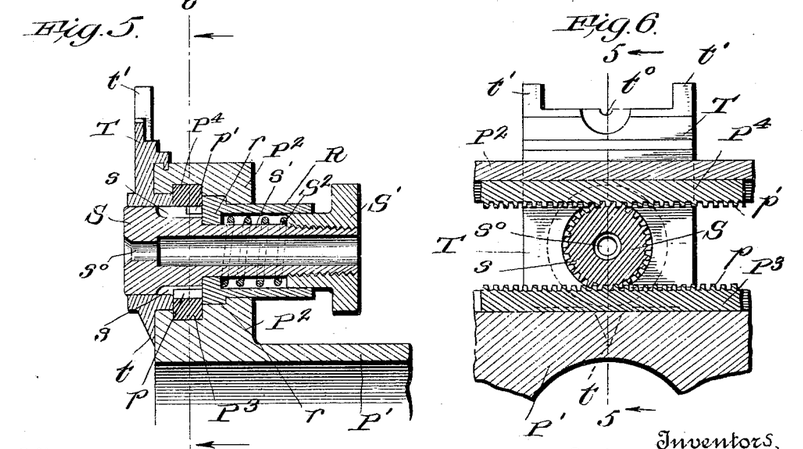
Fig. 5 shows a section through the sliding leaf, and the parts for operating the same, being taken along the line 5—5 of Fig. 6, and looking in the direction of the arrows.
Fig. 6 shows a section along the line 6—6 of Fig. 5, and looking in the direction of the arrows.

Projecting upward from the sleeve $P'$, which is secured to the rear end of the sighting bar D, as already described, is a block $P^2$, which carries two parallel horizontal rack bars $P^3$ and $P^4$. The teeth $p$ of the rack bar $P^3$ are longer than the teeth $p'$ of the rack bar $P^4$, as shown most clearly in Fig. 5, and meshing with these teeth are the teeth $s$ of the pinion S, which pinion is provided with a hollow stem $s'$ carrying a hand knob $S'$, which knob is normally pressed outward by means of the spring $S^2$, as shown in Fig. 5. The stem of this pinion S is journaled in bearings $r$ of the hollow sleeve R mounted in the block $P^2$. The pinion S is provided with a peep hole $s^0$, for use in an auxiliary line of sight.

T represents the sliding leaf, which is provided with the pointer $t$ which travels along the scale $p^0$, carried by the rack $P^3$. This sliding leaf is also provided with a sight notch $t^0$, and with lugs $t'$, whose purpose will hereinafter be described. The pinion S is journaled in this sliding leaf T, and the spring $S^2$ normally holds the teeth $s$ of said pinion in engagement with both the teeth $p$ and $p'$ of the rack bars $P^3$ and $P^4$ respectively; and thus the sliding leaf is normally held against lateral motion; but in order to move said leaf to compensate for lateral errors, push in on the hand knob $S'$ against the spring $S^2$ until the teeth $s$ clear the teeth $p'$, and then turning the knob $S'$ to the right or left will cause the sliding leaf to move in the reverse direction, and the sliding leaf may be set at the desired angle to compensate for lateral errors; and then, if the knob $S'$ is let go, the teeth $s$ will automatically snap into engagement with the teeth $p'$; and thus will firmly lock the sliding leaf against being shaken loose.

Figure 1:
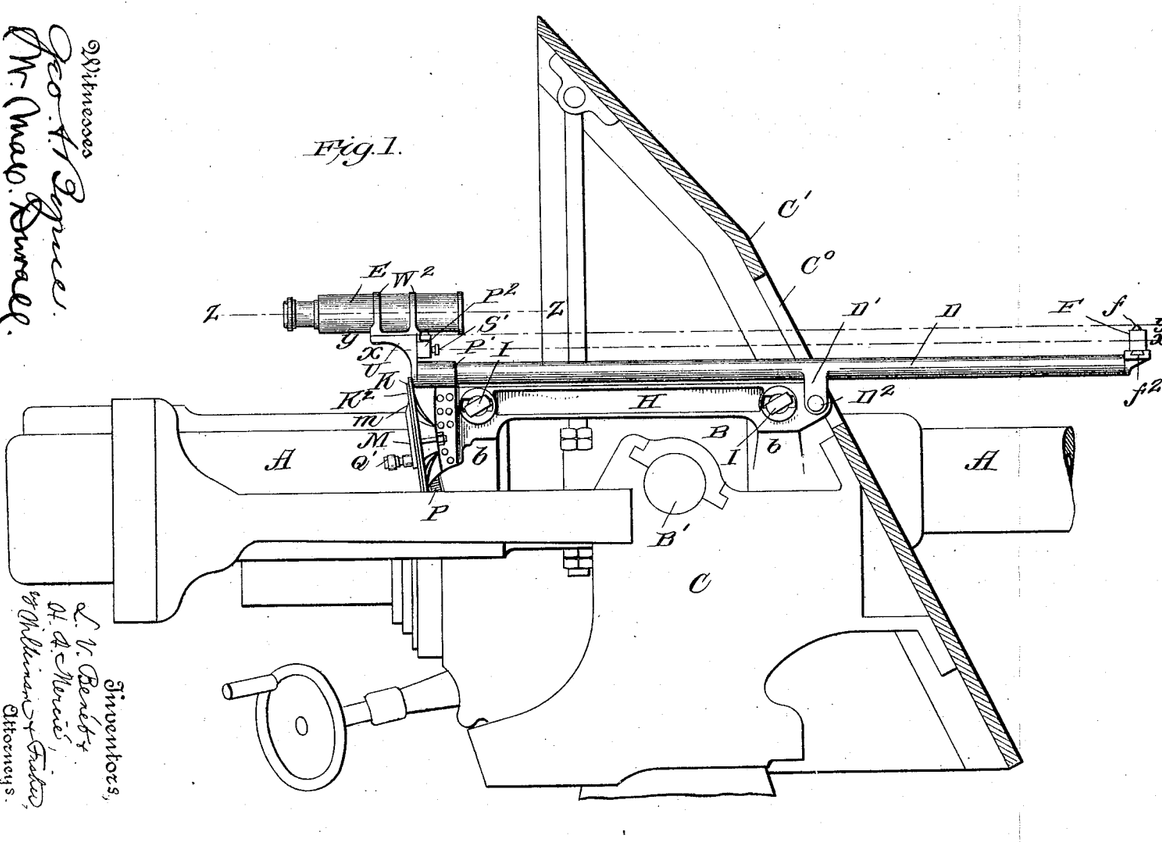
Figure 1 is a side elevation of the gun and mount showing the gun shield in section.
Figure 2:
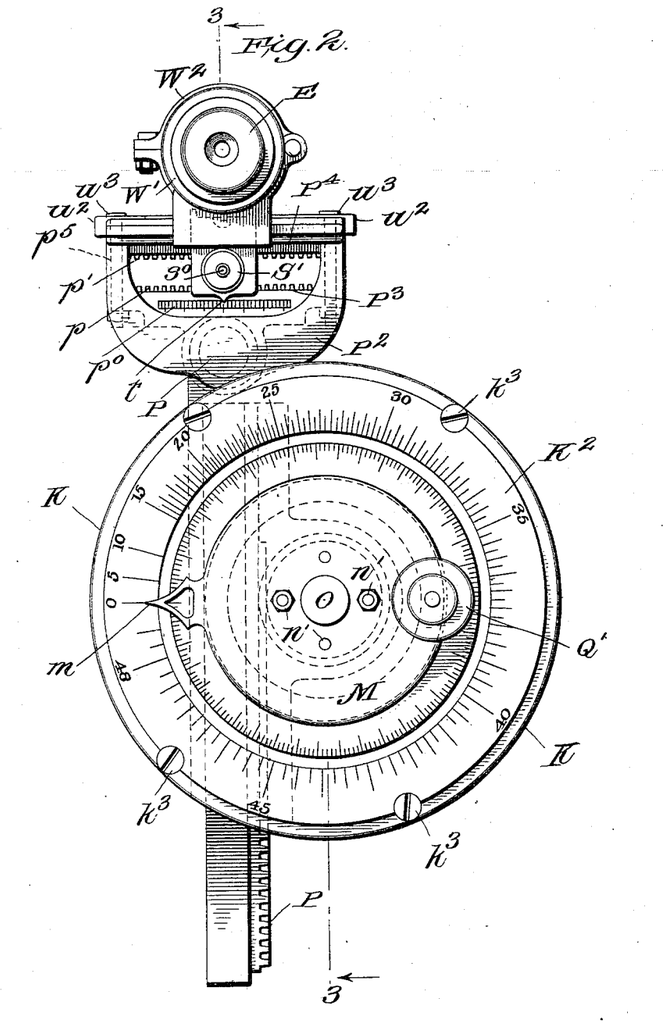
Fig. 2 is a rear view of the complete sighting apparatus detached from the gun, and on a larger scale than is shown in Fig. 1.
Figure 10:
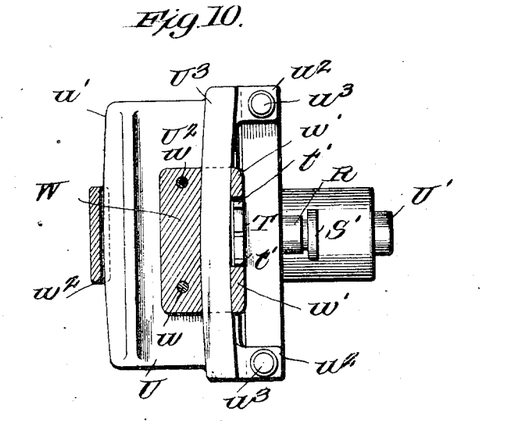
Fig. 10 shows a section along the line 10—10 of Fig. 7, and looking down.

The peep hole $s^0$ and the cross hairs $f'$ of the front sight form a secondary line of sight $x$—$x$, as shown in Figs. 1 and 3, while the notch $t^0$ and the front sight $f$ form a primary line of sight $y$—$y$, as also shown in Figs. 1 and 3. A third, or telescopic, line of sight $z$—$z$ is also provided, as shown in Figs. 1 and 7, without interfering with the apparatus either for adjusting the sights in elevation, or laterally by merely attaching the telescope to the apparatus, so that it will move laterally with the sliding leaf T. This is accomplished as follows. U represents a bracket, which is provided with a tongue $U'$ securely held in the hollow bar D, as by the pins $u^0$ and $p$, as shown in Fig. 7. This bracket is provided with lugs $u^2$, secured by bolts $u^3$ to the block $P^2$, and the said bracket is provided with a horizontal plane $U^2$, having a curved guide rib $U^3$ and a curved rear face $u'$, which form guides for the block W, and the guide lug $w^2$ of the telescope carrier. This telescope carrier consists of a lower member $W'$ secured, by means of the pins $w$, to the block W, and of upper members $W^2$, which upper and lower members form straps to firmly hold the telescope in the carriage. The block W is recessed to slip over the guide rib $U^3$, as shown in Fig. 10, and has lugs $w'$ engaging the lugs $t'$ on the sliding leaf T, see Fig. 10, and thus the telescope is caused to move laterally with the sliding leaf $t$, but has a curvilinear motion due to the shape of the guide rib $U^3$, and the guide face $u'$, and these curves are in the form of arcs of circles having the point $f$ of the front sight as a center. Thus it will be noted that the axis of the telescope is held firmly against disturbance in a vertical plane, and swings vertically with the bar D about its pivot $D^2$, as the pinion N is turned for elevation or depression, as already described. Furthermore, it will be noted that moving the sliding leaf to correct for lateral errors will also move the telescope, and that no independent adjustment of the telescope is required.

It will be obvious that with the telescope in position, either of the lines of sight $x$—$x$ or $z$—$z$ may be used by the gun pointer; while, if the telescope be removed for any cause, either of the lines of sight $x$—$x$ or $y$—$y$ may be used by the gun pointer.

Figures 11, 12, 13:
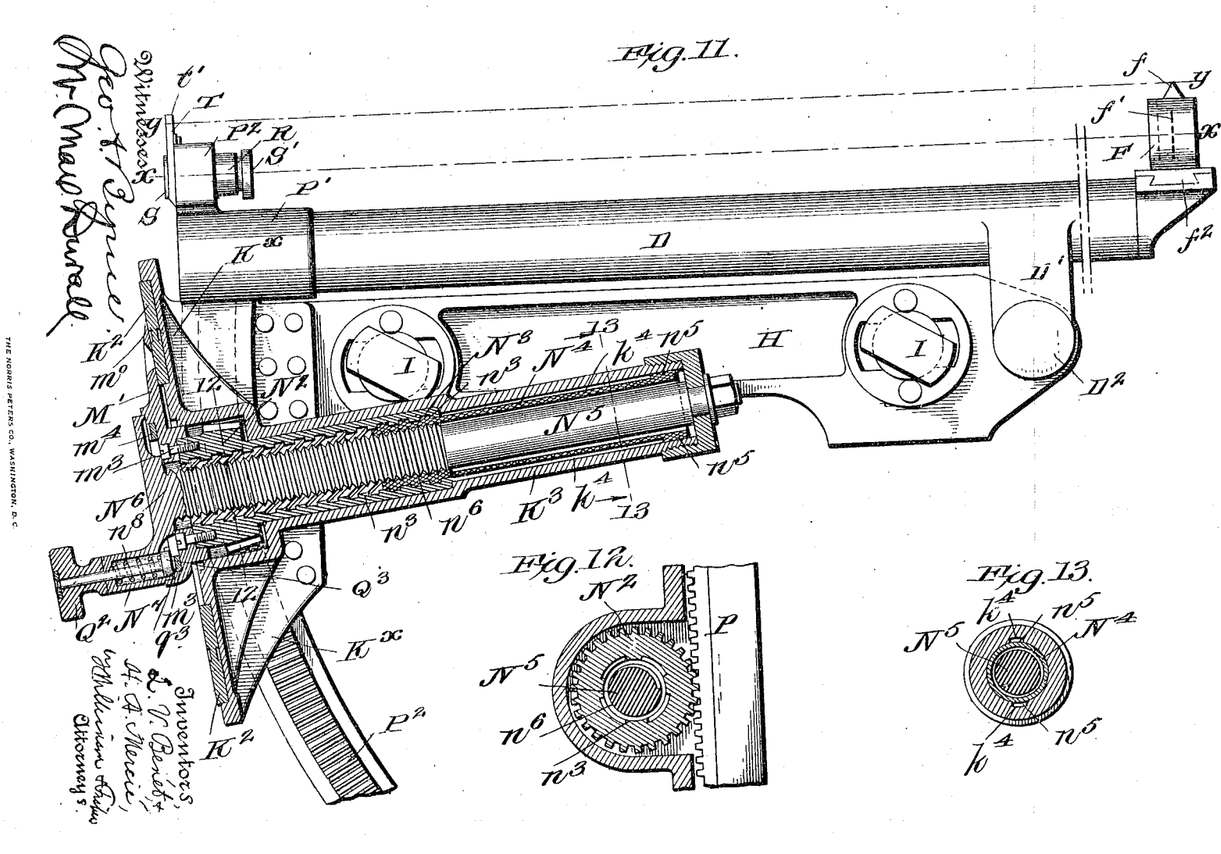
Fig. 11 is a similar view to that shown in Fig. 3 of the modified form of device.
Fig. 12 shows a section along the line 12—12 of Fig. 11, looking in the direction of the arrows.
Fig. 13 shows a section along the line 13—13 of Fig. 11, looking in the direction of the arrows.
Figure 14:
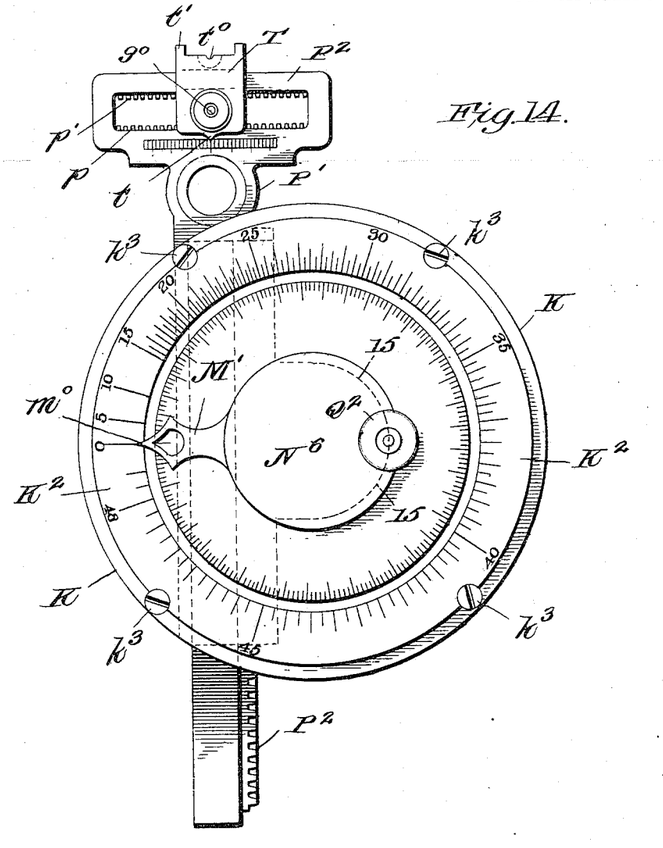
Fig. 14 is a rear elevation of the apparatus shown in Fig. 11.
Figure 15:
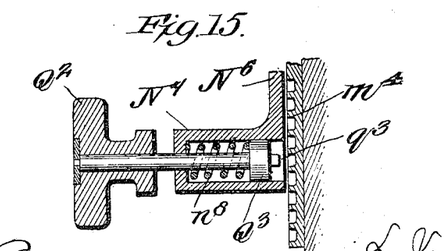
Fig. 15 is a detail showing the spring lock for holding the indicator in the desired position against vibrations of the system.

In the apparatus shown in Figs. 11 to 15, there is no change made from that already described with regard to the various parts carried by the bar D, but the only changes made are in connection with the apparatus for varying the elevation of the line of sight. In this modification, $K^\times$ represents a gear box, which is provided with a graduated plate $K^2$, similar to that shown in Figs. 2 and 3. The plate M′ carrying the pointer $m^0$ is rotated over this plate $K^2$; and in rotating it turns the angular pinion $N^2$ engaging the curved rack $P^2$, and thus elevates or depresses the bar D, as will be hereinafter described. This plate M′ is secured to the pinion $N^2$ by means of bolts $m^3$, and carries a circular rack $m^4$. The pinion $N^2$ is provided with a hollow sleeve $n^3$, which is interiorly screw threaded, as at $n^3$, to engage corresponding male screw threads on the hollow sleeve $N^4$, which sleeve $N^4$ is provided with guide ribs $n^5$, which engage in guide grooves $k^4$ in the hollow sleeve $K^3$ secured to the back of the box $K^\times$, thus preventing the sleeve $N^4$ from turning. The sleeve $N^3$ is journaled in an enlargement of said sleeve $K^3$, as shown in Fig. 11. The sleeve $N^4$ is interiorly screw threaded to engage the male screw threads $n^6$ on the journal $N^5$ of the block $N^6$, which block carries a socket piece $N^7$, and in which is mounted a spring $n^8$, which normally presses forward the plunger $Q^3$ carrying the lock $q^3$, causing it to engage with a circular rack $m^4$ on the plate M. This lock $q^3$ may be withdrawn by drawing back on the knob $Q^2$ against the action of the spring $n^8$, as shown in Fig. 15, and thus the block $N^6$ and screw $n^6$ may be freely turned by hand, when desired. The sighting apparatus may be moved vertically as follows: draw back the knob $Q^2$ until the lock $q^3$ is clear of the rack, as shown in Fig. 15, and then rotate the block $N^6$ by turning said knob $Q^2$. This will rotate the screw $n^6$, and will move the sleeve $N^4$ longitudinally. The longitudinal motion of this sleeve will cause the teeth $n^3$, having a quick pitch, to rotate the pinion $N^2$, and this pinion will move the curved rack P up or down, thus varying the elevation of the line of sight. This movement is irreversible, that is to say, any effort tending to rotate the angular gear $N^2$ such as the weight of the bar D, shocks during firing, etc. is opposed and neutralized as follows: If the angular gear $N^2$ and with it the internally threaded sleeve $N^3$ were rotated, this would move the sleeve $N^4$ longitudinally. This longitudinal motion of the sleeve $N^4$ is only possible however when the screw $n^6$ turns. The screw $n^6$ is however of such fine pitch that the angle of its thread is less than the angle of friction of the materials constituting the screw $n^6$ and the nut $N^4$. As a result any tendency of the latter to move longitudinally does not tend to rotate the screw $n^6$, but on the contrary to oppose its rotation, as this increases the friction between the threads of $n^6$ and the female thread of $N^4$. As a result the sleeve $N^4$ serves as a lock to hold the parts in position against jars incident to the firing of the gun, even though the lock $q^3$ be out of engagement with the rack $m^4$. As soon as the knob $Q^2$ is let go, the lock $q^3$ will snap back into engagement with the rack $m^4$, and the parts will be positively locked in position. It will be seen that in the apparatus shown in Fig. 11, the parts $N^6$, $N^4$ and $N^3$ constitute a compound screw gearing between the hand knob $Q^2$ and the pointer plate M′.

In both forms of apparatus, it will be noted that we provide scales which may be clearly read, and which will indicate both angles of elevation and ranges in yards or meters, or other units of distance. It will also be seen that we provide means for turning the indicator over this scale and for automatically locking it in the desired position against being shaken loose, and that we also provide similar means for adjusting the sights for lateral errors, and for locking same in position; that we provide means for using the sights either with or without a telescope; and for detachably connecting the telescope with the apparatus without altering the action of the adjusting means, either for elevation or for lateral errors; and finally, it will be noted that the entire sighting apparatus may be attached to, or removed from, the cradle of the gun as a unit, by simply attaching or removing the plate H from said cradle.

It will be noted that the sights are so located and arranged that they will not materially interfere with the proper management or control of the gun.

It will be obvious that various modifications might be made in the herein described apparatus, which could be used without departing from the spirit of our invention.

Having thus described our invention, what we claim and desire to secure by Letters Patent of the United States, is:

1. In a sighting apparatus for guns, the combination with a pivoted supporting bar and sights carried thereby, of means for tilting said bar through a vertical angle, comprising a curved rack carried by said bar, a pinion meshing in said rack, and means for automatically locking said pinion against rotation, and for rotating said pinion comprising compound screw gearing, substantially as described.

2. In a sighting apparatus for guns, the combination with a plate connected to the cradle of the gun, of a supporting bar pivoted to said plate, sights carried by said bar, a curved rack projecting downward from said bar, a gear box carried by said plate, a pinion journaled in said gear box, and meshing with said rack, a scale plate carried by said gear box, a pointer adapted to rotate over said scale plate, and compound screw gearing for simultaneously rotating said pointer and said pinion, substantially as described.

3. In a sighting apparatus for guns, the combination with a plate connected to the cradle of the gun, of a supporting bar pivoted to said plate, sights carried by said bar, a curved rack projecting downward from said bar, a gear box carried by said plate, a pinion journaled in said gear box, and meshing with said rack, a scale plate carried by said gear box, a pointer adapted to rotate over said scale plate, compound screw gearing for simultaneously rotating said pointer and said pinion, with means for automatically locking both said pointer and said pinion against rotation, substantially as described.

4. In a sighting apparatus for guns, the combination with a pivoted supporting bar and sights carried thereby, of means for tilting said bar through a vertical angle, comprising a curved rack, a pinion, a spring, and means controlled thereby for automatically locking said pinion against rotation, means for throwing said locking means out of engagement and compound screw gearing for rotating said pinion, substantially as described.

5. In a sighting apparatus for guns, the combination with a plate, and means for connecting same to the cradle of the gun, of a supporting bar pivoted to said plate, sights carried by said bar, a curved rack projecting downward from said bar, a gear box carried by said plate, a pinion journaled in said gear box, and meshing with said rack, a scale plate carried by said gear box, a plate carrying a pointer adapted to rotate over said scale plate, means for rigidly connecting said pointer carrying plate and said pinion, and means for rotating said pointer and carrying plate, comprising compound screw gearing substantially as described.

6. In a sighting apparatus for guns, the combination with a plate, and means for connecting same to the cradle of the gun, of a supporting bar pivoted to said plate, sights carried by said bar, a curved rack projecting downward from said bar, a gear box carried by said plate, a pinion journaled in said gear box, and meshing with said rack, a scale plate carried by said gear box, a plate carrying a pointer adapted to rotate over said scale plate, means for rigidly connecting said pointer carrying plate and said pinion, and compound screw gearing for rotating said pointer carrying plate, with means for automatically locking said pointer carrying plate against rotation, substantially as described.

7. In a sighting apparatus for guns, the combination with a plate connected to the cradle of the gun, of a supporting bar pivoted to said plate, sights carried by said bar, a curved rack projecting downward from said bar, a gear box carried by said plate, a pinion journaled in said gear box, and meshing with said rack, a scale plate carried by said gear box, a pointer adapted to rotate over said scale plate, a hand knob, and means controlled by said hand knob for rotating both said pointer and said pinion, with compound screw gearing for automatically locking both said pointer and said pinion against rotation, substantially as described.

8. In a sighting apparatus for guns, the combination with a pivoted supporting bar and a front sight carried thereby, a sliding leaf mounted at the rear end of said bar, and a telescope carriage detachably connected to said sliding leaf and moving therewith, of means for tilting said bar through a vertical angle, comprising a curved rack carried by said bar, a pinion meshing in said rack, and compound screw gearing for rotating said pinion and for automatically locking said pinion against rotation, substantially as described.

9. In a sighting apparatus for guns, the combination with a plate connected to the cradle of the gun, of a supporting bar pivoted to said plate, a front sight carried by said bar, a sliding leaf mounted at the rear end of said bar, and a telescope carriage detachably connected to said sliding leaf and moving therewith, a curved rack projecting downward from said bar, a gear box carried by said plate, a pinion journaled in said gear box, and meshing with said rack, a scale plate carried by said gear box, a pointer adapted to rotate over said scale plate, and compound screw gearing for simultaneously rotating said pointer and said pinion, substantially as described.

10. In a sighting apparatus for guns, the combination with a plate connected to the cradle of the gun, of a supporting bar pivoted to said plate, a front sight carried by said bar, a sliding leaf mounted at the rear end of said bar, and a telescope carriage detachably connected to said sliding leaf and moving therewith, a curved rack projecting downward from said bar, a gear box carried by said plate, a pinion journaled in said gear box, and meshing with said rack, a scale plate carried by said gear box, a pointer adapted to rotate over said scale plate, means for simultaneously rotating said pointer and said pinion, with means for automatically locking both said pointer and said pinion against rotation, substantially as described.

11. In a sighting apparatus for guns, the combination with a pivoted supporting bar and sights carried thereby, of means for tilting said bar through a vertical angle, comprising a curved rack carried by said bar, a pinion meshing in said rack, a female screw carried by said pinion and having a coarse pitch, a hollow sleeve provided with coarse exterior screw threads and fine interior screw threads, the coarse threads engaging the threads of the screw carried by the pinion, said sleeve also being held against rotation but free to move longitudinally, and a screw having fine threads engaging in the interior threads of said hollow sleeve, with means for turning said screw, substantially as described.

12. In a sighting apparatus for guns, the combination with a pivoted supporting bar and sights carried thereby, of means for tilting said bar through a vertical angle, comprising a curved rack carried by said bar, a pinion meshing in said rack, a female screw carried by said pinion and having a coarse pitch, a hollow sleeve provided with coarse exterior screw threads and fine interior screw threads, the coarse threads engaging the threads of the screw carried by the pinion, said sleeve also being held against rotation but free to move longitudinally, a screw having fine threads engaging in the interior threads of said hollow sleeve, with means for turning said screw, and means for automatically locking said screw against rotation, substantially as described.

13. In a sighting apparatus for guns, the combination with a pivoted supporting bar and sights carried thereby, of means for tilting said bar through a vertical angle, comprising a curved rack carried by said bar, a pinion meshing in said rack, a female screw carried by said pinion and having a coarse pitch, a hollow sleeve provided with coarse exterior screw threads and fine interior screw threads, the coarse threads engaging the threads of the screw carried by the pinion, said sleeve also being held against rotation but free to move longitudinally, a screw having fine threads engaging in the interior threads of said hollow sleeve, with means for turning said screw, said means comprising an arm projecting from said screw, and a hand knob revolubly connected to said arm, substantially as described.

14. In a sighting apparatus for guns, the combination with a pivoted supporting bar and sights carried thereby, of means for tilting said bar through a vertical angle, comprising a curved rack carried by said bar, a pinion meshing in said rack, a female screw carried by said pinion and having a coarse pitch, a hollow sleeve provided with coarse exterior screw threads and fine interior screw threads, the coarse threads engaging the threads of the screw carried by the pinion, said sleeve also being held against rotation but free to move longitudinally, a screw having fine threads engaging in the interior threads of said hollow sleeve, with means for turning said screw, said means comprising an arm projecting from said screw, and a hand knob revolubly connected to said arm, with a spring operated detent connected to said hand knob for normally locking said arm against turning, but which may be released by withdrawing said hand knob slightly rearward, substantially as described.

15. In a sighting apparatus for guns, the combination with a plate connected to the cradle of the gun, of a supporting bar pivoted to said plate, sights carried by said bar, a curved rack projecting downward from said bar, a gear box carried by said plate, a pinion journaled in said gear box, and meshing with said rack, a scale plate carried by said gear box, a pointer adapted to rotate over said scale plate, and compound screw gearing for simultaneously rotating said pointer and said pinion, with an arm and hand knob revolubly connected to said arm for operating said screw gearing, substantially as described.

16. In a sighting apparatus for guns, the combination with a plate, and means for connecting same to the cradle of the gun, of a supporting bar pivoted to said plate, sights carried by said bar, a curved rack projecting downward from said bar, a gear box carried by said plate, a pinion journaled in said gear box, and meshing with said rack, a scale plate carried by said gear box, a plate carrying a pointer adapted to rotate over said scale plate, means for rigidly connecting said pointer carrying plate and said pinion, and means for rotating said pointer carrying plate, comprising compound screw gearing and a hand knob revolubly connected to a member of said gearing, substantially as described.

17. In a sighting apparatus for guns, the combination with a plate connected to the cradle of the gun, of a supporting bar pivoted to said plate, sights carried by said bar, a curved rack projecting downward from said bar, a gear box carried by said plate, a pinion journaled in said gear box, and meshing with said rack, a scale plate carried by said gear box, a pointer adapted to rotate over said scale plate, a hand knob, and compound screw gearing controlled by said hand knob for rotating both said pointer and said pinion, substantially as described.

18. In a sighting apparatus for guns, the combination with a plate connected to the cradle of the gun, of a supporting bar pivoted to said plate, a front sight carried by said bar, a sliding leaf mounted at the rear end of said bar, and a telescope carriage detachably connected to said sliding leaf and moving therewith, a curved rack projecting downward from said bar, a gear box carried by said plate, a pinion journaled in said gear box, and meshing with said rack, a scale plate carried by said gear box, a pointer adapted to rotate over said scale plate, and compound screw gearing for simultaneously rotating said pointer and said pinion, with independent means for automatically locking said pointer and pinion against rotation, substantially as described.

19. In a sighting apparatus for guns, the combination with a plate, and means for connecting same to the cradle of the gun, of a supporting bar pivoted to said plate, sights carried by said bar, a curved rack projecting downward from said bar, a gear box carried by said plate, a pinion journaled in said gear box and meshing with said rack, a scale plate carried by said gear box, a plate carrying a pointer adapted to rotate over said scale plate, means for rigidly connecting said pointer carrying plate and said pinion, and compound screw gearing for rotating said pointer carrying plate, with means for simultaneously locking said pointer carrying plate against rotation, comprising a spring operated detent with means for releasing same when desired, substantially as described.

20. In a sighting apparatus for guns, the combination with a pivoted supporting bar and a front sight carried thereby, of a sliding leaf mounted at the rear end of said bar, a telescope carriage connected to said sliding leaf and moving therewith, and means for tilting said bar through a vertical angle, comprising a rack and pinion, and compound screw gearing for rotating said pinion substantially as described.

21. In a sighting apparatus for guns, the combination with a plate connected to the cradle of the gun, of a supporting bar pivoted to said plate, a front sight carried by said bar, a sliding leaf mounted at the rear end of said bar, a telescope carriage detachably connected to said sliding leaf and moving therewith, a curved rack projecting downward from said bar, and compound screw gearing for moving said rack through a vertical angle and for automatically locking the same in any desired position, substantially as described.

22. In a sighting apparatus for guns, the combination with a plate connected to the cradle of the gun, of a supporting bar pivoted to said plate, a front sight carried by said bar, a sliding leaf mounted at the rear end of said bar, means for automatically locking said sliding leaf in any desired position, and means for tilting said bar through any desired angle, and for automatically locking the bar in the desired position, substantially as described.

23. In a sighting apparatus for guns, the combination with a pivoted supporting bar, of a sliding leaf mounted at the rear end of said bar, a telescope carriage connected to said sliding leaf and moving laterally therewith, and means for tilting said bar through a vertical angle, comprising a rack and pinion, and compound screw gearing for rotating said pinion substantially as described.

24. In a sighting apparatus for guns, the combination with a plate connected to the cradle of the gun, of a supporting bar pivoted to said plate, a sliding leaf mounted at the rear end of said bar, a telescope carriage detachably connected to said sliding leaf and moving laterally therewith, a curved rack projecting downward from said bar, and compound screw gearing for moving said rack through a vertical angle and for automatically locking the same in any desired position, substantially as described.

25. In a sighting apparatus for guns, the combination with a pivoted supporting bar, a sliding leaf mounted at the rear end of said bar, a bracket secured to the rear end of said bar, a telescope carriage mounted on said bracket and connected to said sliding leaf and moving laterally therewith, and means for tilting said bar through a vertical angle, comprising a rack and pinion and compound screw gearing for rotating said pinion substantially as described.

26. In a sighting apparatus for guns, the combination with a plate connected to the cradle of the gun, and a supporting bar pivoted to said plate, of a sliding leaf mounted at the rear end of said bar, a bracket secured to the rear end of said bar, a telescope carriage mounted on said bracket and connected to said sliding leaf and moving laterally therewith, a curved rack projecting downward from said bar, and compound screw gearing for moving said rack through a vertical angle and for automatically locking the same in any desired position, substantially as described.

27. In a sighting apparatus for guns, the combination with a supporting bar pivoted to the cradle, a sliding leaf mounted at the rear end of said bar, and means for adjusting and automatically locking said sliding leaf in any desired position, comprising two parallel oppositely disposed racks having teeth of unequal length, carried by said bar, and a longitudinally movable pinion carried by said leaf and adapted to engage one or both of said racks, as may be desired, substantially as described.

28. In a sighting apparatus for guns, the combination with a supporting bar pivoted to the cradle, a sliding leaf mounted at the rear end of said bar, and means for adjusting and automatically locking said sliding leaf in any desired position, comprising two parallel oppositely disposed racks having teeth of unequal length, carried by said bar, and a longitudinally movable pinion carried by said leaf and adapted to engage one or both of said racks, as may be desired, with a spring normally pressing said pinion into engagement with both of said racks, and means for withdrawing said pinion clear of one of said racks in opposition to the action of said spring, substantially as described.

In testimony whereof, we affix our signature, in presence of two witnesses.

LAURENCE V. BENÉT.
HENRI A. MERCIÉ.

Witnesses:
ALFRED C. KOENNER,
CHARLES KURER.